US009235512B2

(12) United States Patent
Dietrich et al.

(10) Patent No.: US 9,235,512 B2
(45) Date of Patent: Jan. 12, 2016

(54) SYSTEM, METHOD, AND COMPUTER PROGRAM PRODUCT FOR GRAPHICS PROCESSING UNIT (GPU) DEMAND PAGING

(71) Applicant: NVIDIA Corporation, Santa Clara, CA (US)

(72) Inventors: Andreas Dietrich, Heltersberg (DE); David K. McAllister, Holladay, UT (US); Heiko Friedrich, Beckingen-Honzrath (DE); Konstantin Anatolievich Vostryakov, Pushkino (RU); Steven Parker, Draper, UT (US); James Lawrence Bigler, Murray, UT (US); Russell Keith Morley, Salt Lake City, UT (US)

(73) Assignee: NVIDIA Corporation, Santa Clara, CA (US)

( * ) Notice: Subject to any disclaimer, the term of this patent is extended or adjusted under 35 U.S.C. 154(b) by 67 days.

(21) Appl. No.: 14/151,724

(22) Filed: Jan. 9, 2014

(65) Prior Publication Data
US 2014/0204098 A1    Jul. 24, 2014

Related U.S. Application Data

(60) Provisional application No. 61/754,500, filed on Jan. 18, 2013.

(51) Int. Cl.
*G06F 12/08* (2006.01)
*G06T 1/60* (2006.01)
*G06F 12/10* (2006.01)

(52) U.S. Cl.
CPC ............ *G06F 12/08* (2013.01); *G06F 12/1009* (2013.01); *G06F 12/1045* (2013.01); *G06T 1/60* (2013.01)

(58) Field of Classification Search
CPC . G06F 12/08; G06F 12/1009; G06F 12/1045; G06T 1/60
See application file for complete search history.

(56) References Cited

U.S. PATENT DOCUMENTS

| | | | |
|---|---|---|---|
| 4,991,081 A * | 2/1991 | Bosshart | 711/3 |
| 5,790,852 A * | 8/1998 | Salm | 718/104 |
| 7,472,253 B1 * | 12/2008 | Cameron et al. | 711/203 |
| 2004/0073768 A1 * | 4/2004 | Bottemiller et al. | 711/207 |
| 2013/0016109 A1 * | 1/2013 | Garanzha | 345/501 |
| 2014/0101405 A1 * | 4/2014 | Papadopoulou et al. | 711/207 |

OTHER PUBLICATIONS

NVIDIA, "An Update from NVIDIA," NVIDIA Newsletter, 2012, retrieved from http://www.nvidia.com/content/newsletters/web/nv-newsletter/optix-email-web.html.
Denning, P. J., "Virtual Memory," Computing Surveys, vol. 2, No. 3, Sep. 1970, pp. 153-180.

* cited by examiner

*Primary Examiner* — Maurice L McDowell, Jr.
(74) *Attorney, Agent, or Firm* — Zilka-Kotab, PC (57) ABSTRACT

A system, method, and computer program product are provided for GPU demand paging. In operation, input data is addressed in terms of a virtual address space. Additionally, the input data is organized into one or more pages of data. Further, the input data organized as the one or more pages of data is at least temporarily stored in a physical cache. In addition, access to the input data in the physical cache is facilitated.

19 Claims, 7 Drawing Sheets

SYSTEM, METHOD, AND COMPUTER PROGRAM PRODUCT FOR GRAPHICS PROCESSING UNIT (GPU) DEMAND PAGING

CLAIM OF PRIORITY

This application claims the benefit of U.S. Provisional Patent Application No. 61/754,500, filed Jan. 18, 2013, the entire contents of which are incorporated herein by reference.

FIELD OF THE INVENTION

The present invention relates to graphics processing, and more particularly to storing and accessing data in the context of graphics processing.

BACKGROUND

Some graphics processing unit (GPU) based applications require that input data is processed when the overall size of the input data is too large to fit completely into GPU device memory. One solution for this problem is to split computation into multiple kernel runs, and process one chunk of data at a time. This approach works well with algorithms that process data sequentially, but can become problematic in cases where random (read/write) access to data is required (e.g. recursive ray tracing, etc.). Thus, there is a need for addressing this issue and/or other issues associated with the prior art.

SUMMARY

A system, method, and computer program product are provided for GPU demand paging. In operation, input data is addressed in terms of a virtual address space. Additionally, the input data is organized into one or more pages of data. Further, the input data organized as the one or more pages of data is at least temporarily stored in a physical cache. In addition, access to the input data in the physical cache is facilitated.

DETAILED DESCRIPTION

Figure 1:
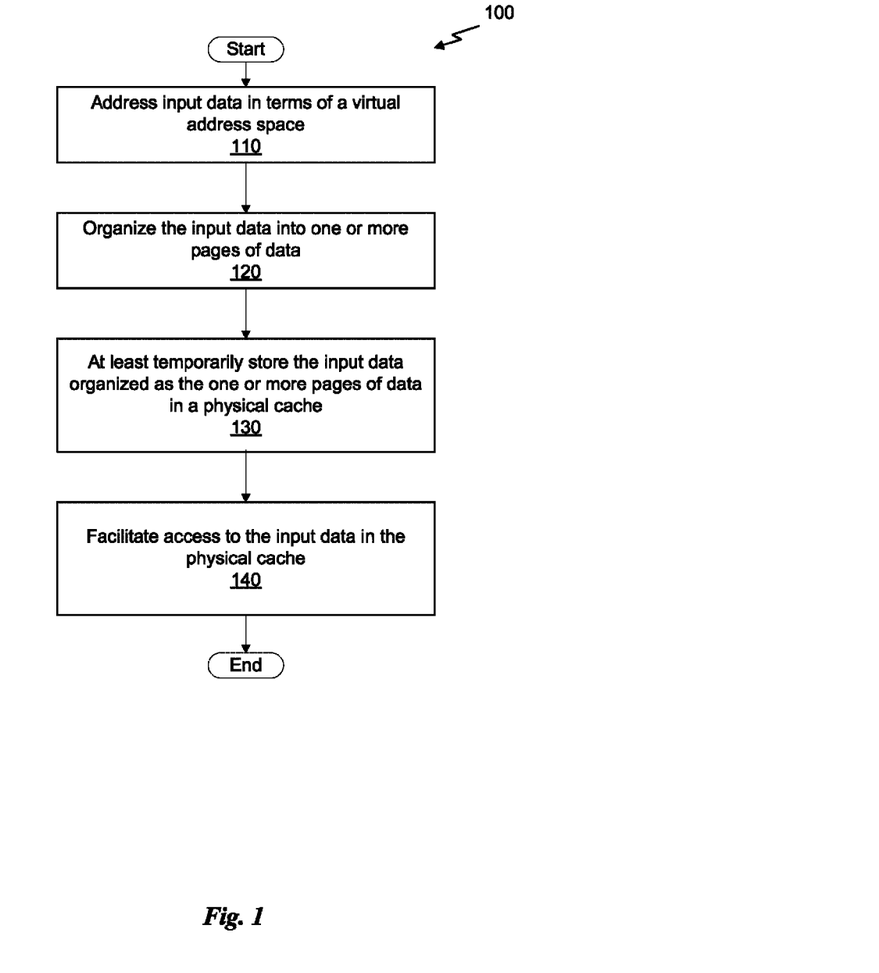
FIG. 1 illustrates a flowchart of a method for GPU demand paging, in accordance with one embodiment.

FIG. 1 illustrates a flowchart of a method 100 for GPU demand paging, in accordance with one embodiment. As shown in operation 110, input data is addressed in terms of a virtual address space. In one embodiment, the virtual address space may be associated with two processors. For example, in one embodiment, the virtual address space may be associated with at least one of a graphics processing unit (GPU) and/or a central processing unit (CPU).

Additionally, in one embodiment, a size of the virtual address space may be determined dynamically. For example, rather than using a fixed-size virtual address space, the size of the virtual address space may be determined dynamically before initially beginning computation. In one embodiment, the virtual address space may be determined based on the size of the input data.

As shown in operation 120, the input data is organized into one or more pages of data. Further, as shown in operation 130, the input data organized as the one or more pages of data is at least temporarily stored in a physical cache (e.g. associated with a GPU, CPU, etc.). Moreover, in operation 140, access to the input data in the physical cache is facilitated.

In one embodiment, each page of data may be assigned a time stamp. Further, in one embodiment, each time stamp may be updated each time the page of data is accessed (e.g. during a read operation, etc.). In one embodiment, the method 100 may further include identifying a number of least recently used pages of data by sorting the time stamps.

In this case, in one embodiment, the time stamps may be sorted using a sorting kernel that is separate and run before a page processing kernel. In one embodiment, the sorting kernel may generate a list that the page processing kernel is capable of utilizing to update at least one of a page table or the physical cache.

Still yet, in one embodiment, facilitating access to the input data in the physical cache may include receiving a GPU thread request to access a particular page of data. As an option, the method 100 may further include performing a page table lookup to determine the availability of the particular page of data in the physical cache.

In this case, if the particular page of data is available in the physical cache, a page table entry may provide a current physical address of the requested particular page of data. In this way, a thread may be capable of using the physical address of the requested particular page of data to access the particular page of data. On the other hand, if the particular page of data is not available in the physical cache, the particular page of data may be requested for upload and a thread may interrupt a current computation (e.g. and may yield to a host processor, etc.).

For example, in one embodiment, threads may receive and/or fetch work items from queues. When a thread is blocked on a page fault, the thread may store the live state to GPU memory. The thread may then fetch another work item. Once there are no more work items, or no more space to store the state of blocked work items, the kernel terminates. At this point, control may return to the host for processing page requests.

In one embodiment, if there are no more threads able to continue working without requested data being uploaded, the kernel may terminate. Further, as an option, the page table and the physical cache may be updated and modified pages may be downloaded to the host. In one embodiment, old pages of data may be evicted from the physical cache.

In various embodiments, the page table may be a variety of sizes and/or structures. For example, in one embodiment, the page table may include a non-hierarchical page table, with one 64-bit page descriptor per page of data. Of course, in various embodiments, the page descriptor may be various sizes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
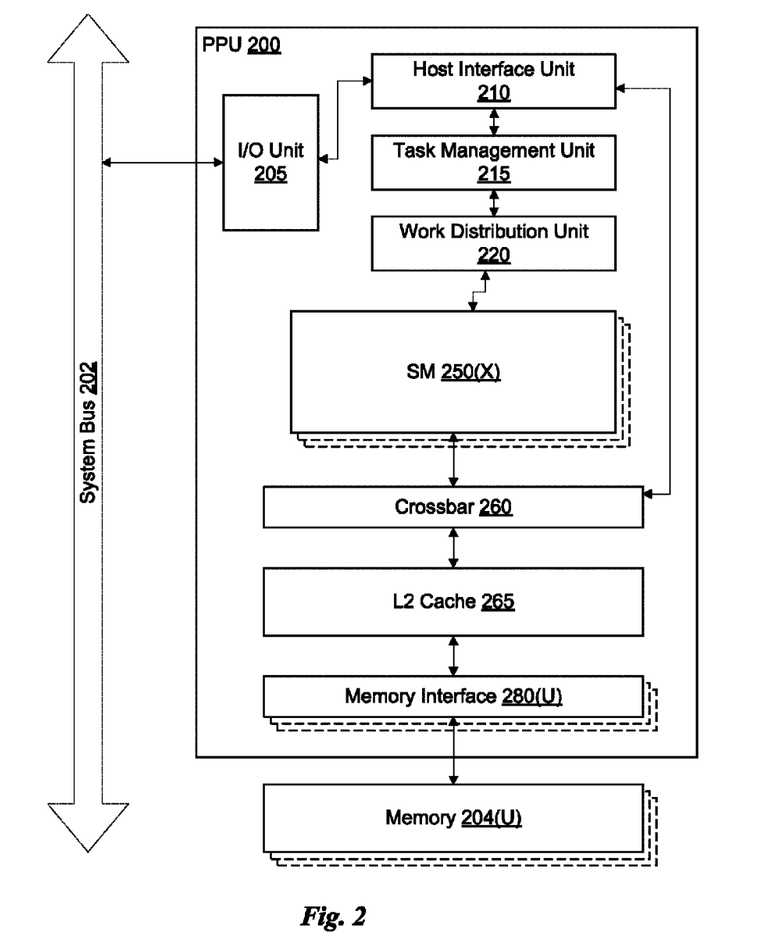
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or more of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams.

The TMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies.

An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data.

The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program.

The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
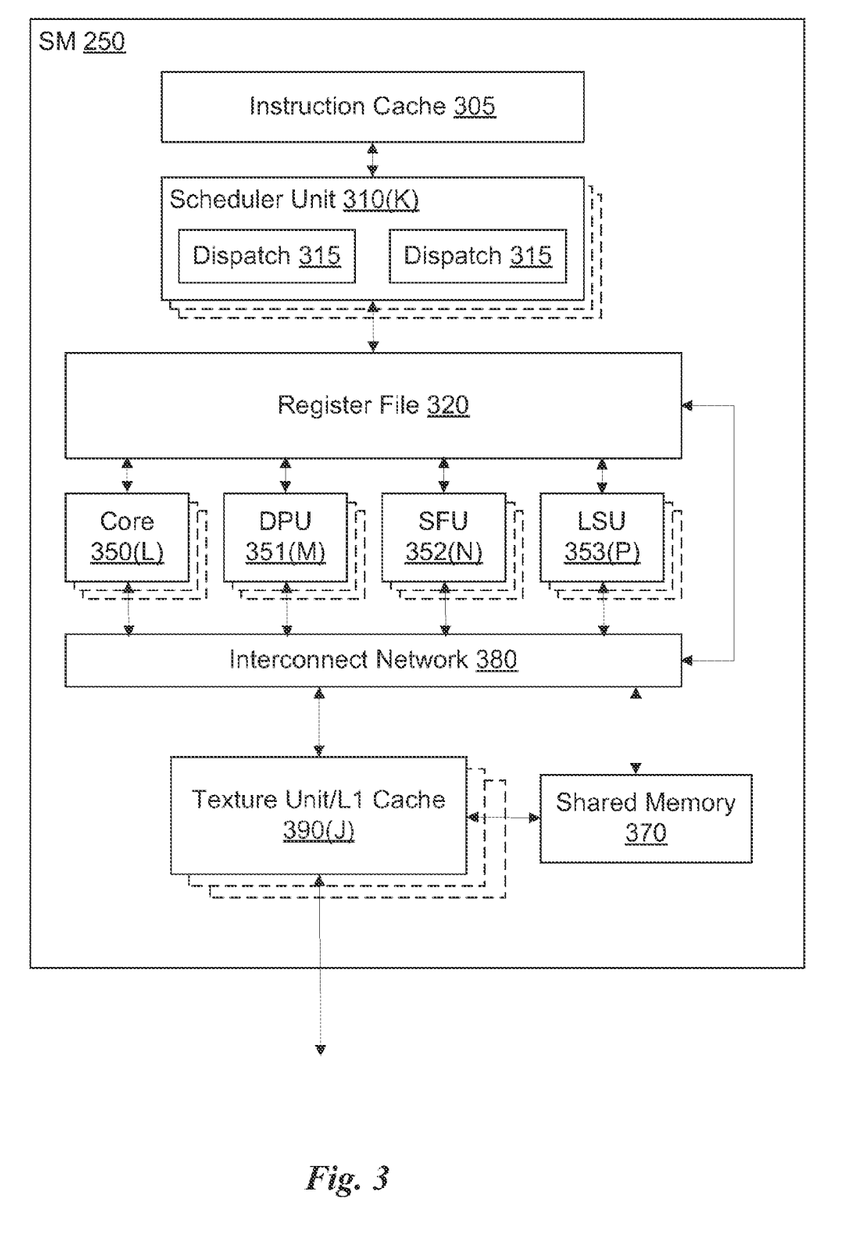
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. In one embodiment, the texture unit/L1 caches 390 may be configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

In one embodiment, the systems described herein may function to implement a software demand paging approach. For example, in one embodiment, an input data set may be addressed in terms of a virtual address space, organized in pages. In this case, in one embodiment, actual data may reside temporarily in a device side cache (e.g. holding a fixed maximum number of pages at a time, etc.). Further, in one embodiment, this technique may be integrated into the NVIDIA OptiX JIT (Just-In-Time) compiler, which creates a GPU kernel that performs these actions.

Figure 4:
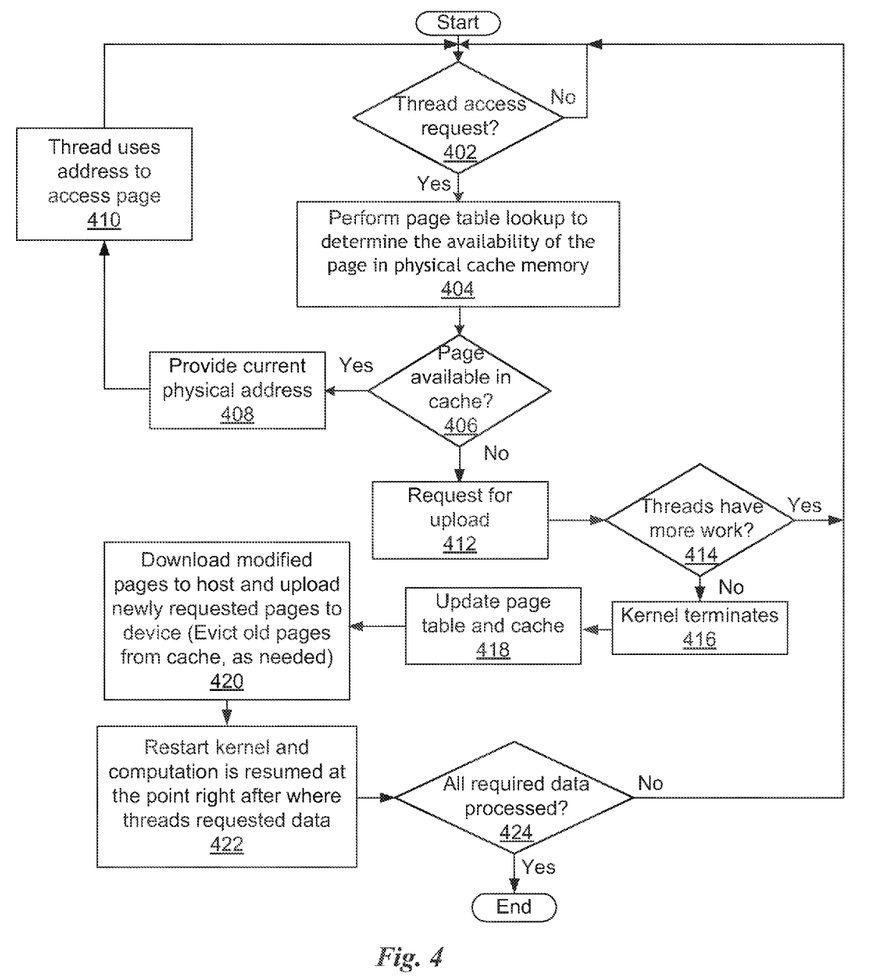
FIG. 4 illustrates a flowchart of a method for providing access to cached data, in accordance with one embodiment.

FIG. 4 illustrates a flowchart of a method 400 for providing access to cached data, in accordance with one embodiment. As an option, the method 400 may be implemented in the context of the previous Figures and/or any subsequent Figure(s). Of course, however, the method 400 may be implemented in any desired environment. It should also be noted that the aforementioned definitions may apply during the present description.

As shown in FIG. 4, it is determined whether a GPU thread access request to a virtual page is received. See decision 402. Once a GPU thread requests access to a virtual page, a page table lookup is performed to determine the availability of the page in physical cache memory. See operation 404.

Further, it is determined whether the page is available in the physical cache. See decision 406. If the page is available in the physical cache, a page table entry provides the current physical address of the requested page. See operation 408. Additionally, the thread uses this address to access the page data. See operation 410.

If the page is not available in the cache, the page data is requested for upload and the thread interrupts its current computation and yields to the host processor. See operation 412. Further, it is determined whether any threads have more work to perform. See decision 414.

Once there are no more threads that can continue working without requested data being uploaded, the kernel terminates. See operation 416. Furthermore, the page table and physical page cache are updated. See operation 418.

Modified pages are then downloaded to the host device and newly requested pages are uploaded to the GPU device. See operation 420. During this process, old pages are evicted from the cache as needed. Subsequently, the kernel is restarted and computation is resumed at the point after where threads requested data. See operation 422. Moreover, the update cycle repeats with page table lookups to determine the availability of the page in physical cache, until the kernel has finished its algorithm and all required data has been processed. See decision 424.

In this way, threads may receive and/or fetch work items from queues. If a thread is blocked on a page fault, the thread may store a live state to memory (e.g. GPU memory, etc.). The thread may then fetch another work item. Once there are no more work items, or no more space to store the state of blocked work items, the kernel may terminate. Upon termination, control may return to the host for processing page requests. In one embodiment, a ray tracing compiler may insert store instructions to save all live states to global memory. Further, when the kernel is restarted after page requests are satisfied, prior work items from the queue are resumed by loading their live state from global memory.

In one embodiment, a GPU may be utilized to implement the method 400. In various embodiments, this GPU based approach may differ in certain areas from typical CPU hardware/software based demand paging methods. For example, the GPU based implementation may be configured to implement a dynamic virtual address space. In this case, rather than using a fixed-size virtual address space (e.g. 64-bit, etc.), the size of the virtual address space may be determined dynamically before initially starting computation on the GPU. In one embodiment, before starting computation, the size of the virtual address space may be defined as the size of the input source data. In one embodiment, in case the input data changes during the life of a host application, the virtual address space may grow or shrink as needed.

Additionally, in one embodiment, the GPU based implementation may utilize a flat page table. For example, due to dynamically adapting the size of the virtual address space, it is possible to employ a small, flat, non-hierarchical page table (e.g. with one 64-bit page descriptor per virtual page, etc.). In contrast, CPU page tables typically need to be organized as a tree structure in order to manage a sparsely occupied address space.

Further, in one embodiment, the GPU may implement GPU based page request processing. In this case, page requests may be processed once the main kernel cannot proceed with computation due to page misses and the main kernel has terminated. In one embodiment, to identify requested pages, a bit-field may be used, containing as many bits as there are virtual pages. In this case, relevant request bits may be set when pages are requested. In one embodiment, processing of these requests may be implemented in a separate GPU helper kernel that scans the request bits to find requested pages. In one embodiment, the GPU helper kernel may also determines suitable physical pages to be evicted from the cache, update page table descriptors, and generate a list of pages that are requested to be uploaded from the host.

In addition, in one embodiment, the GPU approach may implement asynchronous data upload. For example, after the page processing kernel is launched, a second helper kernel may be launched, which is responsible for data upload. In one embodiment, this loader kernel may copy requested pages from host memory into the page cache with the help of the GPU's zero copy functionality. This enables the copy process to be interleaved with the host CPU, which can asynchronously fetch (e.g. over a network, etc.) and stage further pages for upload.

Still yet, in one embodiment, the GPU approach may function to implement a least recently used (LRU) page eviction policy. For example, in order to determine suitable pages in the cache that can be replaced by newly requested pages, a least recently used page replacement policy may be implemented. This technique may be implemented to evict pages first that have not been accessed for the longest time in the past. The LRU algorithm represents the theoretically optimal evictions strategy. This method is typically only approximated in CPU paging systems due to its high costs.

More information associated with the LRU page eviction policy may be found in "Virtual Memory" (Denning, P. J., 1970, *ACM Computing Surveys* 2 (3): 153-189), which is hereby incorporated by reference in its entirety.

Figure 5:
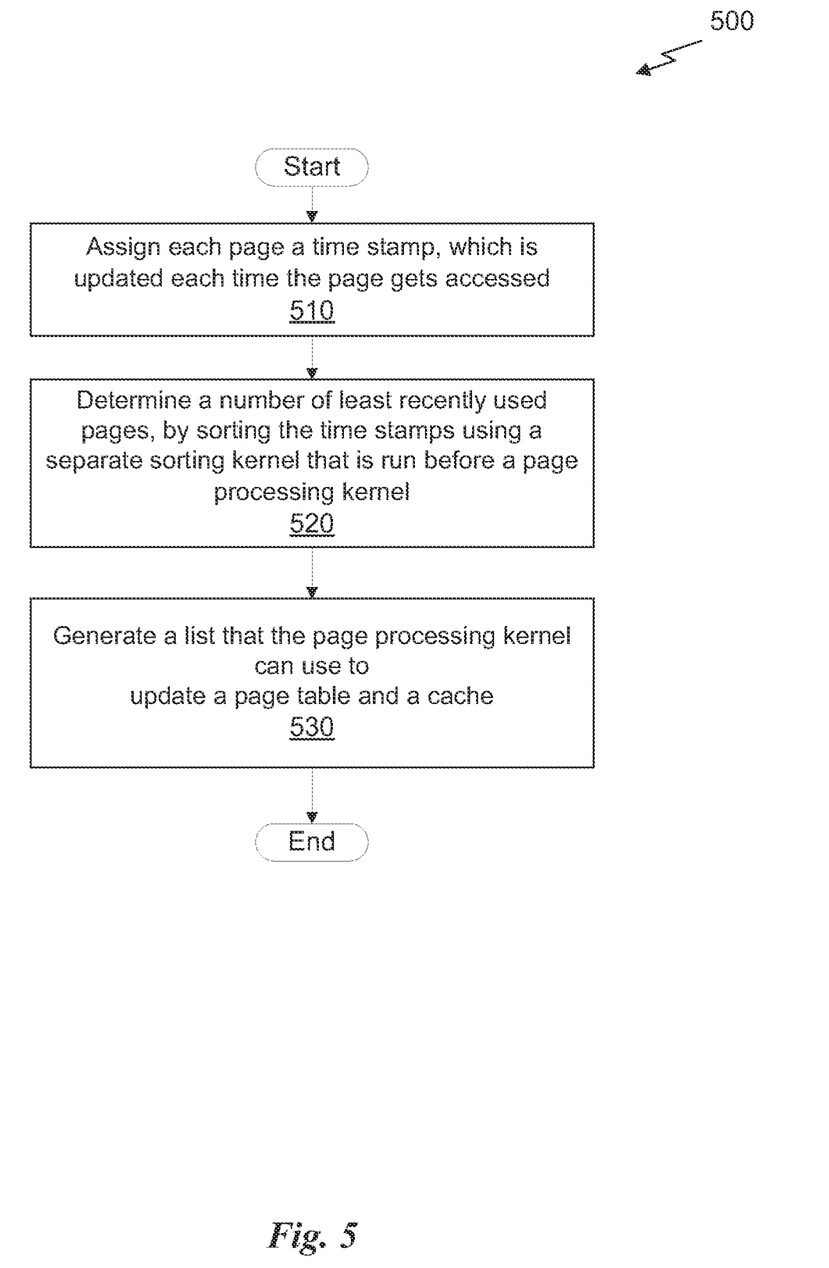
FIG. 5 illustrates a flowchart of a method for demand paging, in accordance with another embodiment.

FIG. 5 illustrates a flowchart of a method 500 for demand paging, in accordance with another embodiment. As an option, the method 500 may be implemented in the context of the previous Figures and/or any subsequent Figure(s). Of course, however, the method 500 may be implemented in any desired environment. It should also be noted that the aforementioned definitions may apply during the present description.

As shown in operation 510, each page may be assigned a time stamp, which is updated each time the page gets accessed. In one embodiment, multiple memory accesses to a single page may be combined such that they do not each require an update of the time stamp.

In order to find a number of least recently used pages, the time stamps may be sorted by a separate sorting kernel that is run before the page processing kernel, as shown in operation 520. The sort kernel may then generate a list, which the processing kernel may use to update the page table and the cache, as shown in operation 530. In this way, a GPU may implement GPU software based demand paging by implementing a method to support random access of arbitrarily sized data, independent of available GPU device memory. For example, in one embodiment, GPU software based demand paging may be implemented in the context of ray tracing.

Ray tracing on a GPU differs from rasterization in that, for rasterization, when a geometric object is drawn, the textures and shader programs for that geometry need to be resident and bound, and that geometry needs to reside or be sent to the GPU. However, no other textures, shaders, or geometry need to be resident. With ray tracing, on the other hand, rays can hit any geometry in the scene, especially reflected rays. This means that in a straightforward implementation, all geometry, textures, and shaders need to be resident and bound the entire time that any rays are being traced. Thus, a ray traceable scene is limited to the size of the GPU memory. In OptiX, all shaders are made to be bound and resident by linking them into a single CUDA megakernel that is used for all ray tracing. In one embodiment, this may be implemented using the OptiX compiler.

Figure 6:
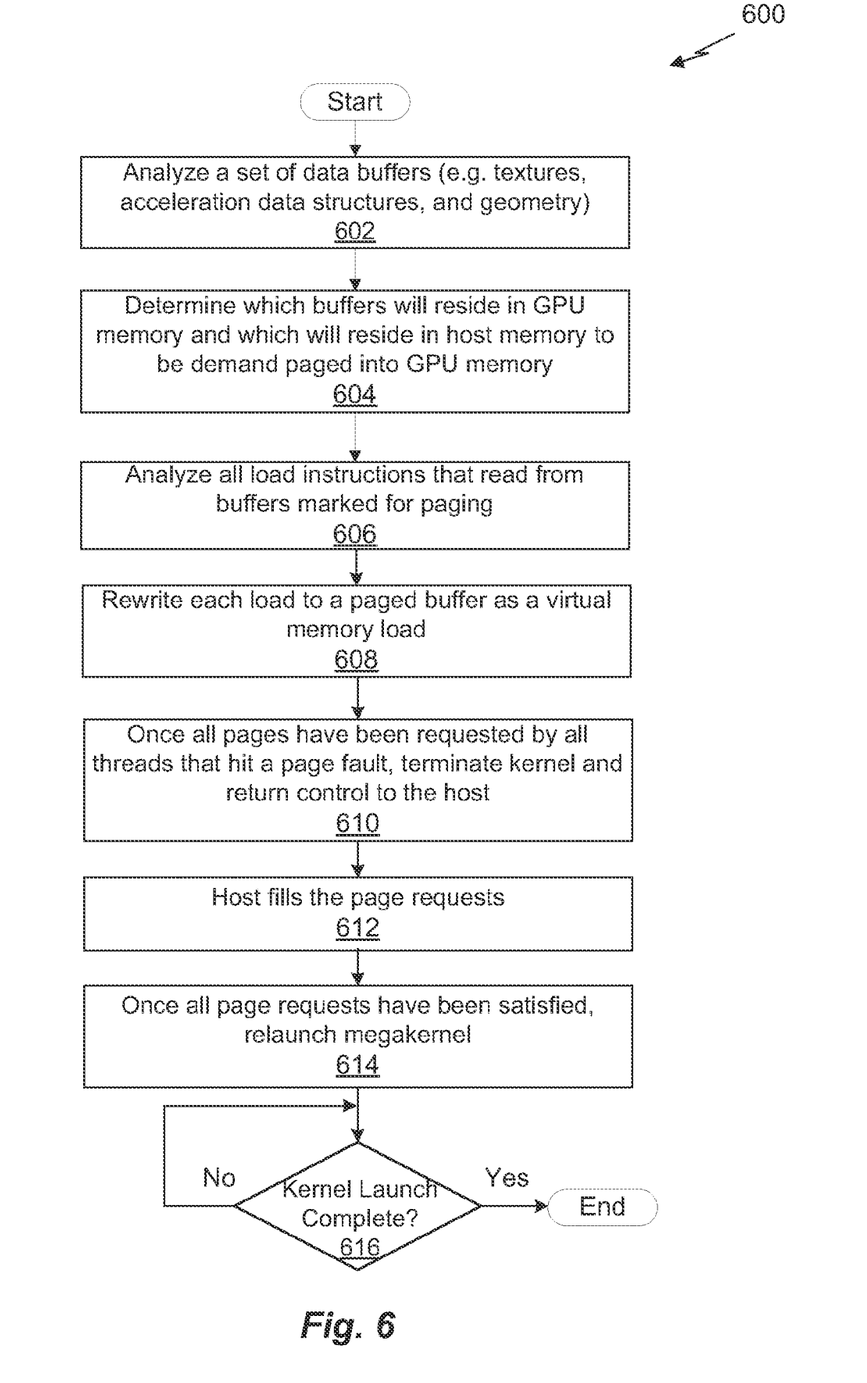
FIG. 6 illustrates a flowchart of a method for demand paging, in accordance with another embodiment.

FIG. 6 illustrates a flowchart of a method 600 for demand paging, in accordance with another embodiment. As an option, the method 600 may be implemented in the context of the previous Figures and/or any subsequent Figure(s). Of course, however, the method 600 may be implemented in any desired environment. It should also be noted that the aforementioned definitions may apply during the present description.

As shown in operation 602, a set of data buffers (e.g. mostly textures, acceleration data structures, and geometry, etc.) may be analyzed. Based on the analysis, it may be determined which buffers are to reside in GPU memory and which buffers are to reside in host memory and be demand paged into GPU memory, as shown in operation 604.

When compiling the megakernel, all load instructions that read from buffers marked for paging are analyzed, as shown in operation 606. Further, each load is rewritten to a paged buffer as a virtual memory load, as shown in operation 608.

In one embodiment, a rewritten load instruction may include a variety of steps. For example, one of the steps may include a page translation. In this case, the virtual address may be split into the page number and the offset. Furthermore, a look up of the page number in the page table may be performed. In one embodiment, the page table may include a bit for indicating whether the page is resident, and a physical address (e.g. an address in CUDA memory space, etc.) of the page, if the page is resident. If the page is resident, the offset to the page's physical address may be added and the load may be performed. Additionally, the page may be marked as in use (e.g. requested, etc.) so that it does not get evicted.

In addition, one of the steps may include a page fault. For example, if the page is not resident, no progress on a corresponding ray may be made until the load is satisfied. In this case, the page may be marked as requested by setting a bit in the page table entry (PTE) or adding the page number to a request queue. Furthermore, all live registers that pertain to this ray may be stored into a GPU global memory buffer. Additionally, the program counter may be stored to return to once the page request is fulfilled. The process may the return to the main computation loop, such that more work is requested or the loop is exited. In one embodiment, the compiler may automatically write the code that loads a current state and jumps to a faulted load instruction.

As shown in operation 610, for page fulfillment, once all pages have been requested by all threads that hit a page fault, the kernel terminates and control returns to the host. In one embodiment, the host may fill the page requests by making a list of all requested pages and choosing locations in the GPU's page cache to store the requested pages. In one embodiment, this may be implemented using a series of CUDA kernels that implement an LRU page replacement policy. Doing this on the GPU means the computation can be implemented efficiently, without copying the page table back to the CPU. Further, any pages that were modified on the GPU may be downloaded to host memory and all of the requested pages may be uploaded to GPU memory.

Once all page requests have been satisfied, the megakernel is relaunched, as shown in operation 614. On the GPU this may include each thread requesting work and any rays that were suspended due to page faults may be resumed. Additionally, a state that was live at the time of the page fault may be reloaded from GPU memory. The thread may then jump to the continuation of the code that was being executed. Further, the page translation may be performed again and the load instruction may be executed.

When a kernel launch completes with no pages requested the ray tracing frame is complete. See decision 616. As an option, the method described in the context of FIG. 6 may be implemented utilizing a ray tracing application compiler (e.g. an OptiX compiler, etc.). Further, in one embodiment, cluster buffers may be utilized to minimize paged loads.

Figure 7:
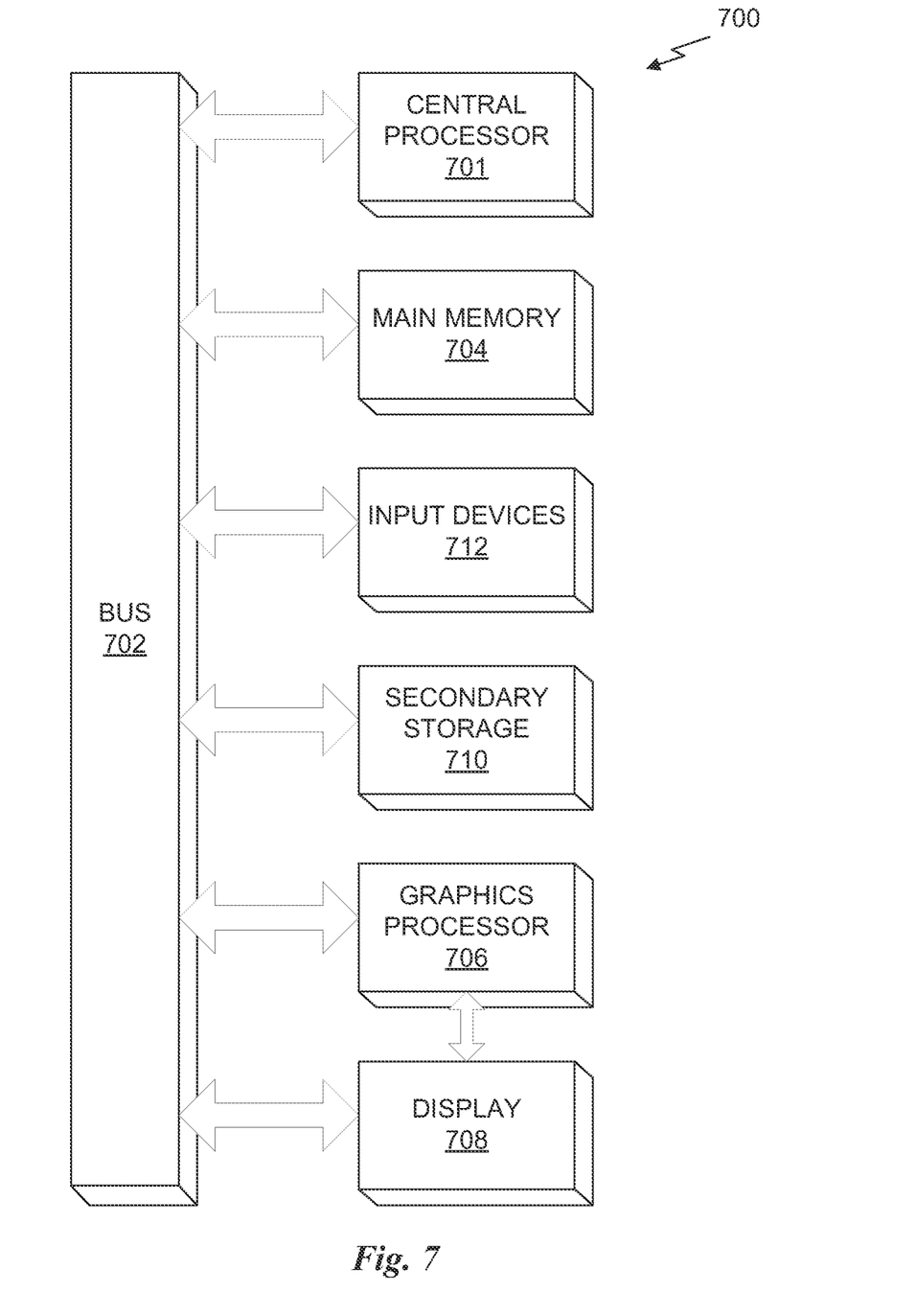
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   addressing input data in terms of a virtual address space;
   organizing the input data into one or more pages of data;
   at least temporarily storing the input data organized as the one or more pages of data in a physical cache;
   facilitating access to the input data in the physical cache;
   analyzing one or more data buffers including at least one of textures, acceleration data structures, or geometry;
   determining which of the one or more buffers will reside in a GPU memory; and
   determining which of the one or more buffers will reside in a host memory and be demand paged into the GPU memory.

2. The method of claim 1, wherein the virtual address space is associated with two processors.

3. The method of claim 1, wherein the virtual address space is associated with a graphics processing unit (GPU) and a central processing unit (CPU).

4. The method of claim 1, wherein a size of the virtual address space is determined dynamically.

5. The method of claim 1, wherein each page of data is assigned a time stamp.

6. The method of claim 5, wherein each time stamp is updated each time the page of data is accessed.

7. The method of claim 6, further comprising identifying a number of least recently used pages of data by sorting the time stamps.

8. The method of claim 1, wherein facilitating access to the input data in the physical cache includes receiving a GPU thread request to access a particular page of data.

9. The method of claim 8, further comprising performing a page table lookup to determine the availability of the particular page of data in the physical cache.

10. The method of claim 9, wherein if the particular page of data is available in the physical cache, a page table entry provides a current physical address of the requested particular page of data.

11. The method of claim 10 wherein a thread is capable of using the physical address of the requested particular page of data to access the particular page of data.

12. A method, comprising:
    addressing input data in terms of a virtual address space;
    organizing the input data into one or more pages of data, wherein each page of data is assigned a time stamp and each time stamp is updated each time the page of data is accessed;
    at least temporarily storing the input data organized as the one or more pages of data in a physical cache; and
    facilitating access to the input data in the physical cache; and
    identifying a number of least recently used pages of data by sorting the time stamps;
    wherein the time stamps are sorted using a sorting kernel associated with a GPU that is separate and run before a page processing kernel associated with the GPU.

13. The method of claim 12, wherein the sorting kernel generates a list that the page processing kernel is capable of utilizing to update at least one of a page table or the physical cache.

14. A method, comprising:
    addressing input data in terms of a virtual address space;
    organizing the input data into one or more pages of data;
    at least temporarily storing the input data organized as the one or more pages of data in a physical cache;
    facilitating access to the input data in the physical cache, wherein facilitating access to the input data in the physical cache includes receiving a GPU thread request to access a particular page of data;
    performing a page table lookup to determine the availability of the particular pages of data in the physical cache;
    wherein if the particular page of data is available in the physical cache, a page table entry provides a current physical address of the requested particular page of data;
    wherein if a thread is blocked on a page fault resulting from requesting the particular page of data, the thread causes storage of a current state to memory and returns control to a host processor for processing page requests, if no other work items exist for the thread.

15. The method of claim 14, wherein a ray tracing compiler inserts store instructions to save all current states to global memory.

16. A method, comprising:
    addressing input data terms of a virtual address space;
    organizing the input data into one or more pages of data;
    at least temporarily storing the input data organized as the one or more pages of data in a physical cache;
    facilitating access to the input data in the physical cache, wherein facilitating access to the input data in the physical cache includes receiving a GPU thread request to access a particular page of data;
performing a page table lookup to determine the availability of the particular page of data in the physical cache;
wherein if the particular page of data is available in the physical cache, a page table entry provides a current physical address of the requested particular page of data;
wherein if there are no threads able to continue working without requested data being uploaded, a kernel associated with the threads terminates.

17. The method of claim 16, wherein the page table and t physical cache are updated and modified pages are downloaded to a host.

18. A non-transitory computer-readable storage medium storing instructions that, when executed by a processor, cause the processor to perform steps comprising:
addressing input data in terms of a virtual address space;
organizing the input data into one or more pages;
at least temporarily storing the input data organized as pages in a physical cache;
facilitating access to the input data in the physical cache;
analyzing one or more data buffers including at least one of textures, acceleration data structures, or geometry;
determining which of the one or more buffers will reside in a GPU memory; and
determining which of the one or more buffers will reside in a host memory and be demand paged into the GPU memory.

19. A system comprising:
a memory system; and
one or more processing cores coupled to the memory system and that are each configured to:
address input data in terms of a virtual address space;
organize the input data into one or more pages;
at least temporarily store the input data organized as pages in a physical cache;
facilitate access to the input data in the physical cache;
analyze one or more data buffers including at least one of textures, acceleration data structures, or geometry;
determine which of the one or more buffers will reside in a GPU memory; and
determine which of the one or more buffers will reside in a host memory and be demand paged into the GPU memory.

* * * * *

UNITED STATES PATENT AND TRADEMARK OFFICE
CERTIFICATE OF CORRECTION

PATENT NO. : 9,235,512 B2
APPLICATION NO. : 14/151724
DATED : January 12, 2016
INVENTOR(S) : Andreas Dietrich et al.

Page 1 of 1

It is certified that error appears in the above-identified patent and that said Letters Patent is hereby corrected as shown below:

In the Claims

Column 12, Line 62 please replace "data terms" with --data in terms--;
Column 13, Line 11 please replace "and t" with --and the--.

Signed and Sealed this
Seventeenth Day of March, 2020

Andrei Iancu
*Director of the United States Patent and Trademark Office*